US012802513B2

(12) United States Patent
Tjaden et al.

(10) Patent No.: US 12,802,513 B2
(45) Date of Patent: Nov. 17, 2026

(54) NITROGEN-INFUSED SMOOTHIE VENDING MACHINE SYSTEMS AND METHODS

(71) Applicant: FRUITFUL LLC, Cypress, TX (US)

(72) Inventors: Stephan Tjaden, Watertown, SD (US); Cole Levine, Cypress, TX (US); Nghia Duc Tin Nguyen, Ho Chi Minh City (VN); Robert Becker, Cypress, TX (US); Andrew Meulemans, La Crosse, WI (US); Rebecca Seemann, Zumbro Falls, MN (US); Jesse Iverson, Grand Forks, ND (US)

(73) Assignee: FRUITFUL LLC, Cypress, TX (US)

( * ) Notice: Subject to any disclaimer, the term of this patent is extended or adjusted under 35 U.S.C. 154(b) by 279 days.

(21) Appl. No.: 18/648,053

(22) Filed: Apr. 26, 2024

(65) Prior Publication Data

US 2024/0371229 A1 Nov. 7, 2024

Related U.S. Application Data

(60) Provisional application No. 63/463,208, filed on May 1, 2023.

(51) Int. Cl.
*G07F 13/00* (2006.01)
*A23G 9/04* (2006.01)
(Continued)

(52) U.S. Cl.
CPC ............. *G07F 13/00* (2013.01); *A23G 9/045* (2013.01); *A23G 9/06* (2013.01); *A23G 9/224* (2013.01); *A23G 9/228* (2013.01); *A23G 9/28* (2013.01)

(58) Field of Classification Search
CPC ............ G07F 13/00; A23G 9/045; A23G 9/06
See application file for complete search history.

(56) References Cited

U.S. PATENT DOCUMENTS 5,348,753 A 9/1994 Ahnell et al.
5,515,687 A 5/1996 Arriulou
(Continued)

FOREIGN PATENT DOCUMENTS

EP 3419743 9/2021

OTHER PUBLICATIONS

International Search Report and Written Opinion corresponding to PCT/US2024/026612 dated Jul. 17, 2024.

*Primary Examiner* — Gene O Crawford
*Assistant Examiner* — Ayodeji H Ojofeitimi
(74) *Attorney, Agent, or Firm* — BARNES & THORNBURG LLP

(57) ABSTRACT

Devices, systems, and methods for a nitrogen-infused smoothie vending machine can a refrigeration system including an insulated housing and refrigerator for cooling an interior portion of the insulated housing, a smoothie storage system including a pressurizable storage vessel for storing smoothie product and an agitation system for agitating smoothie product within the pressurizable storage vessel, the pressurizable storage vessel arranged within the insulated housing, a nitrogen system configured for providing nitrogen for infusion of smoothie product, and a dispensing system configured for dispensing nitrogen-infused smoothie product for consumption. A control system can include at least one processor arranged for execution of instructions stored in memory, and communications circuitry for communicating signals to and from the processor, the control system configured for governing operation of the nitrogen system to provide nitrogen gas for infusion into the smoothie product, and configured for governing operation of the dispensing system for dispensing nitrogen-infused smoothie product.

14 Claims, 3 Drawing Sheets

(51) Int. Cl.

| | |
|---|---|
| ***A23G 9/06*** | (2006.01) |
| ***A23G 9/22*** | (2006.01) |
| ***A23G 9/28*** | (2006.01) |

(56) References Cited

U.S. PATENT DOCUMENTS

| | | | | |
|---|---|---|---|---|
| 6,138,995 | A | 10/2000 | Page | |
| 11,013,247 | B2 | 5/2021 | Giardino et al. | |
| 2011/0000229 | A1 | 1/2011 | Boekhoorn et al. | |
| 2014/0089077 | A1* | 3/2014 | Zuckerman | G07F 17/0064 705/26.8 |
| 2017/0001852 | A1 | 1/2017 | Rege et al. | |
| 2019/0254306 | A1 | 8/2019 | Jones | |
| 2019/0254465 | A1* | 8/2019 | Di Maria | A47J 31/52 |
| 2020/0122994 | A1* | 4/2020 | Cimatti | B67D 1/0888 |
| 2020/0189900 | A1 | 6/2020 | Kleinrichert | |
| 2021/0225120 | A1* | 7/2021 | Levine | G07F 13/04 |

* cited by examiner

NITROGEN-INFUSED SMOOTHIE VENDING MACHINE SYSTEMS AND METHODS

CROSS-REFERENCE

This utility patent application claims the benefit of priority to U.S. Provisional Application No. 63/463,208, filed May 1, 2023, and entitled "NITROGEN-INFUSED SMOOTHIE VENDING MACHINE SYSTEMS AND METHODS," the contents of which are hereby incorporated by reference in their entirety, including without limitation, those portions concerning food vending and/or fluids management.

TECHNICAL FIELD

The present disclosure relates to devices, systems, and methods in the field of food vending. More particularly, the present disclosure relates to devices, systems, and methods in the field of nitrogen-infused smoothie vending.

BACKGROUND

Food vending, and particularly machine food vending, can present challenges intermixed with storage, maintenance, handling, and/or dispensing considerations. Moreover, organic food products, such as smoothies, can face additional challenges to preserve and/or manage food properly for desirable outcomes. Fresh, desirable food products can be provided if such challenges can be overcome, and can be provided with ease under machine process.

SUMMARY

According to an aspect of the present disclosure, a nitrogen-infused smoothie vending machine may include a refrigeration system comprising an insulated housing and refrigerator for cooling an interior portion of the insulated housing, a smoothie storage system comprising a pressurizable storage vessel for storing smoothie product and an agitation system for agitating smoothie product within the pressurizable storage vessel, the pressurizable storage vessel arranged within the insulated housing, a nitrogen system configured for providing nitrogen for infusion of smoothie product, a dispensing system configured for dispensing nitrogen-infused smoothie product for consumption, and a control system comprising at least one processor arranged for execution of instructions stored in memory, and communications circuitry for communicating signals to and from the processor. The control system may be configured for governing operation of the nitrogen system to provide nitrogen gas for infusion into the smoothie product, and may be configured for governing operation of the dispensing system for dispensing nitrogen-infused smoothie product.

In some embodiments, the agitation system may include a mechanical agitator arranged to disrupt settlement of the smoothie product within the pressurizable storage vessel. The agitation system may include magnetic field generation system arranged to provide magnetic driven motion to the mechanical agitator arranged within the pressurizable storage vessel. The control system may be configured to govern operation of the agitation system to agitate the smoothie product.

In some embodiments, the nitrogen system may include a bulk nitrogen storage vessel. The nitrogen system may include a nitrogen generator for producing nitrogen from ambient air. The smoothie product may comprise a slurry.

In some embodiments, the control system may be configured to provide nitrogen from the nitrogen system to the smoothie product storage system. The control system may be configured to provide nitrogen into the pressurizable storage vessel for storing smoothie product for at least partial infusion of the smoothie product. The control system may be configured to provide nitrogen into the pressurizable storage vessel to regulate the oxygen level therein.

In some embodiments, the control system may be configured to selectively operate a nitrogen valve to maintain nitrogen within the pressurizable storage vessel. The nitrogen system may be arranged to supply nitrogen to an infusion contactor configured to pass smoothie product from the pressurizable storage vessel in contact with nitrogen for infusion. The infusion contactor may be arranged between the smoothie storage system and the dispensing system.

In some embodiments, the nitrogen provided from the nitrogen system may be nitrogen gas. The nitrogen provided from the nitrogen system may be nitrogen and carbon dioxide gas. The control system may be arranged in communication with a remote system for communications of vending machine parameters. The vending machine parameters may include at least one of smoothie quality parameters, amount of smoothie within the storage vessel, and amount of nitrogen within the nitrogen system.

According to another aspect of the present disclosure, a method of preparing a nitrogen-infused smoothie may include agitating smoothie product within a nitrogen-prepped vessel, and further infusing the smoothie product during vending, and dispensing the finally-infused smoothie product responsive to user demand.

These and other features of the present disclosure will become more apparent from the following description of the illustrative embodiments.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1A:
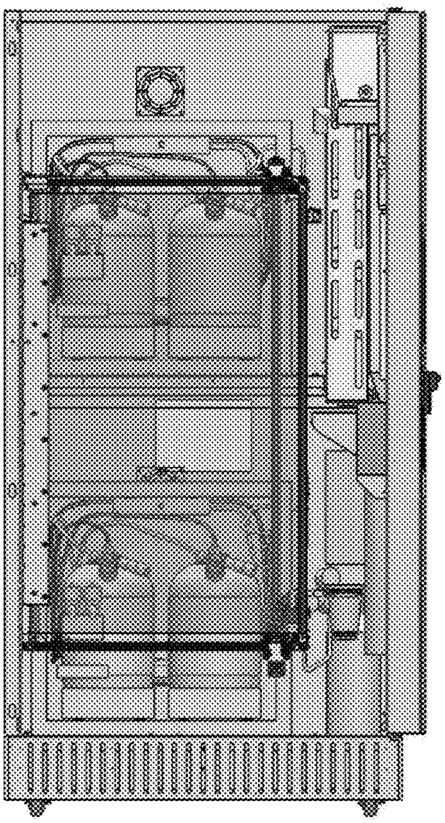
FIGS. 1A-1B are computer generated images of perspective, front, and side views of an illustrative nitrogen-infused smoothie vending machine in accordance with disclosed embodiments of the present disclosure.

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Food products, and particularly, organic food products can face particular food handling challenges. Such challenges can be additionally complicated by machine vending, which requires extended periods without human intervention to attend to the product. Yet, vending machines can lower man power, and/or make food products available at times and/or locations which are challenging to support.

Within many contexts, inert gas, such as nitrogen can reduce food preservation issues, for example, by purging oxygen from the food environment. Additionally, a nitrogen-infused smoothie product presents a unique flavor and/or mouth feeling sensation due to the smooth texture of nitrogen-infusion compared with traditional carbonation. Accordingly, within the present disclosure, devices, systems, and methods for nitrogen-infused smoothie are presented.

Figure 1B:
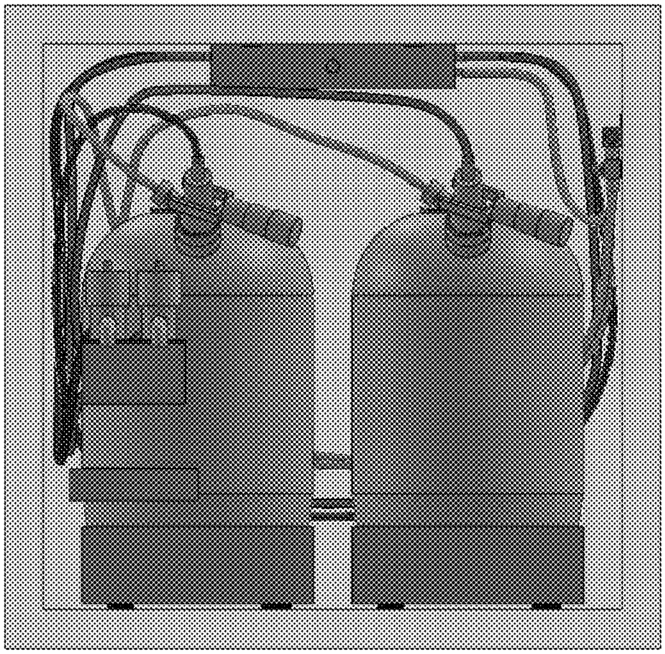

Moreover, machine vending of such a nitrogen-infused smoothie product raising challenges in terms of storage, maintenance, handling, and/or dispensing of the smoothie product as nitrogen-infused smoothie product to produce a pleasing food for consumption. For example, homogeneity, freshness, color, texture, and/or aroma can affect the quality of the product dispensed. Additionally, many smoothie products are embodied as slurrly-like fluids which have unique flow and/or mixing characteristics. Devices, systems, and methods within the present disclosure can address such challenges. As suggested in FIGS. 1A-B, a nitrogen-infused smoothie vending machine 12 is shown for vending nitrogen-infused smoothie product.

Figure 2:
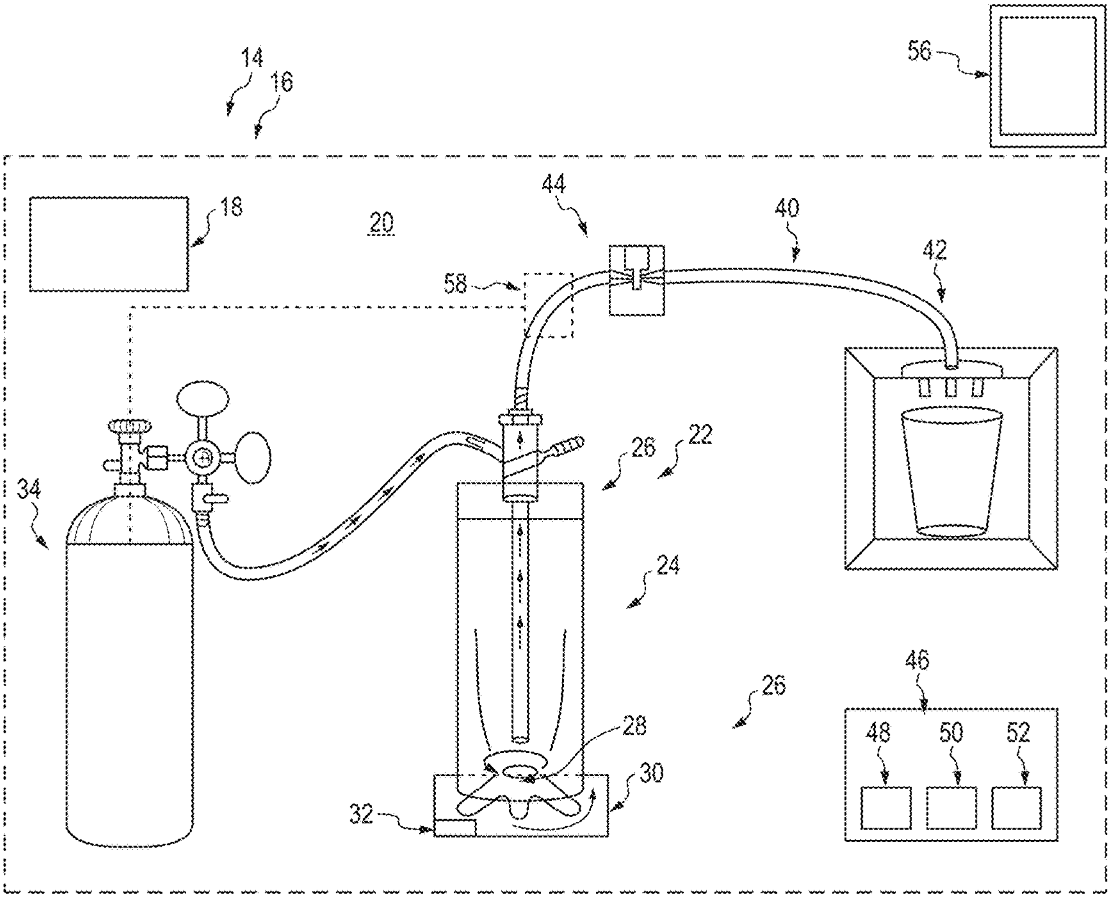
FIG. 2 is a diagrammatic view of the illustrative nitrogen-infused smoothie vending machine in accordance with disclosed embodiments of the present disclosure.

Referring now to the illustrative embodiment of FIG. 2, the nitrogen-infused smoothie vending machine 12 is shown diagrammatically for providing nitrogen-infused smoothie product. The vending machine 12 illustratively includes a refrigeration system 14 comprising an insulated housing 16 and refrigerator 18 for cooling an interior portion 20 of the insulated housing 16. The refrigerator 18 is illustratively embodied as a self-contained refrigeration cycle including suitable pumps, piping and auxiliaries, heat exchangers, expansion devices, and related subsystems for cooling the air within the interior portion 20 and exhaust heat to atmosphere. Although not illustrated in FIG. 2, the vending machine 12 may include a covering, such as an outer housing, within which the insulated housing 16 can reside.

The vending machine 12 illustratively includes a smoothie storage system 22 configured to provide storage of smoothie product. The smoothie storage system 22 includes a storage vessel 24, illustratively embodied as a pressurizable storage vessel, for storing smoothie product for dispensing. The illustrative pressurizable storage vessel is embodied to accept significant pressurization as the mechanism of transport for the smoothie product from the vessel 24 for dispensing. The storage vessel 24 is arranged within the insulated housing, such that the vessel 24 can remain in refrigerated climate for good preservation conditions for the smoothie product.

The smoothie storage system 22 illustratively includes an agitation system 26 for agitating smoothie product within the storage vessel 24. The agitation system 26 is illustratively embodied as a magnetic stirring system comprising an agitator bit 28 arranged within the storage vessel 24 and a magnetic controller 30 arranged in communication with the agitator bit 28 through the wall of the storage vessel 24. The agitator bit 28 is illustratively embodied as a stick or bar of ferromagnetic material, having food-safe covering, such that the bar can be rotated under magnetic field manipulation by the magnetic controller 30 through the wall of the storage vessel 24.

The magnetic controller 30 is illustratively embodied to include a number of electromagnetic coils arranged in a circular pattern for sequential activation, and configured for magnetically rotating the agitator bit 28 within the storage vessel 24 to mix and/or turn the smoothie product. The magnetic controller 30 illustratively includes control circuitry 32 for governing operation of the magnetic coils to produce rotation of the agitator bit 28. The control circuitry 32 is illustratively embodied to include analog components, including power and magnetic control components, but in some embodiments may include any suitable manner of control for the electromagnetic coils, for example, processor-based control.

In the illustrative embodiment of FIG. 2, the agitator system 26 is shown coupled with the bottom portion of the storage vessel 24 such that the agitator bit 28 generally resides on the bottom of the interior of the storage vessel 24 and receives magnetic influence from the magnetic controller 30 through the wall of the bottom portion of the storage vessel 24. In some embodiments, the agitator system 26 may be coupled in any suitable position with the vessel 24.

The agitation system 26 can provide benefits to the safe and/or reliable storage of smoothie product, and/or to the infusion of nitrogen into the smoothie product. Agitation of the smoothie product while in storage can assist in maintaining fresh product, avoiding over-settling and/or potential for undesirable gradation throughout different locations of the storage vessel 24. Agitation in refrigerated climate can reduce the potential for localized ice formation. Agitation can assist with suitable nitrogenation, for example, homogenous and/or sufficient level of infusion of nitrogen into the smoothie product.

The vending machine 12 illustratively includes a nitrogen system 34 for providing nitrogen for infusion within the smoothie product. In the illustrative embodiment, nitrogen gas is provided into the pressurizable storage vessel 24 for infusion into the stored smoothie product. The use of nitrogen gas within storage can ready the smoothie product for use while also providing benefits to the product storage quality.

In the illustrative embodiment as suggested in FIG. 2, the nitrogen system 34 includes a nitrogen storage tank 36 as a reservoir for nitrogen. The nitrogen storage tank 36 is embodied to store gaseous nitrogen, but in some embodiments may store at least partially fluid nitrogen. Nitrogen from the storage tank 36 can be communicated to the storage vessel 24 via piping.

The nitrogen system 34 includes a regulator valve system 38 arranged for regulating nitrogen. The regulator valve system 38 illustratively includes a valve arranged between the storage tank 36 and storage vessel 24, in serial communication with the piping, to provide regulation of the nitrogen delivery to the storage vessel 24. In the illustrative embodiment, the nitrogen within the storage tank 36 is generally stored at a higher pressure than the storage vessel 24, and thus the regulator valve system 38 is configured to provide pressure control to provide nitrogen to the storage vessel 24 at desirable pressure and/or with controlled mass and/or volume of nitrogen to the storage vessel 24.

In the illustrative embodiment, the nitrogen system 24 provides nitrogen to the storage vessel 24. However, in some embodiments, nitrogen may additionally be provided from the storage vessel 24 to the storage tank 36, for example, upon refilling of the storage vessel 24 with new smoothie product such that existing nitrogen within the storage vessel 24 may be recycled for use. In such embodiments, existing piping and/or auxiliaries may be used for transport recirculation of nitrogen to the storage tank, and/or additional piping and/or auxiliaries may be provided for transport recirculation of nitrogen to the storage tank.

In the illustrative embodiment, the nitrogen system 34 is embodied as a refillable system such that storage tank 36 can be refilled and/or replaced with filled nitrogen tanks. In some embodiments, the nitrogen system 34 may include a nitrogen generation system for generating additional nitrogen for use. For example, a nitrogen generation system may include a nitrogen separator, such as a membrane and/or pressure swing absorption type separator, for separating nitrogen from atmospheric air. In some embodiments, the nitrogen generation system may include any suitable manner of nitrogen generation, for example, chemical generation of nitrogen, among others.

The vending machine 12 includes a dispensing system 40 arranged for dispensing nitrogen-infused smoothie product. The dispensing system 40 is configured to providing controlled dispensing of nitrogen-infused smoothie product from a consumer-facing dispenser or tap 42. The tap 42 is arranged to dispense nitrogen-infused smoothie product into a standardized receptacle such as a disposable or reusable cup for consumer use. Accordingly, a dispensing shelf and/or cup holder can be arranged for receiving the standardized receptacle in position to receive nitrogen-infused smoothie product from the tap 42.

In the illustrative embodiment, the dispensing system includes a dispensing valve system 44 arranged in communication with piping for controlled communication of smoothie product from the storage vessel 24 to the tap 42. The dispensing valve system 44 illustratively includes dispensing valve embodied as an electrically-actuated ball valve, although in some embodiments, the dispensing system may include any suitable manner of valve, for example, a globe valve among others. The dispensing valve is arranged serially with the piping, for controlling the flow of smoothie product from the storage vessel 42 to the tap 24.

Figure 3:
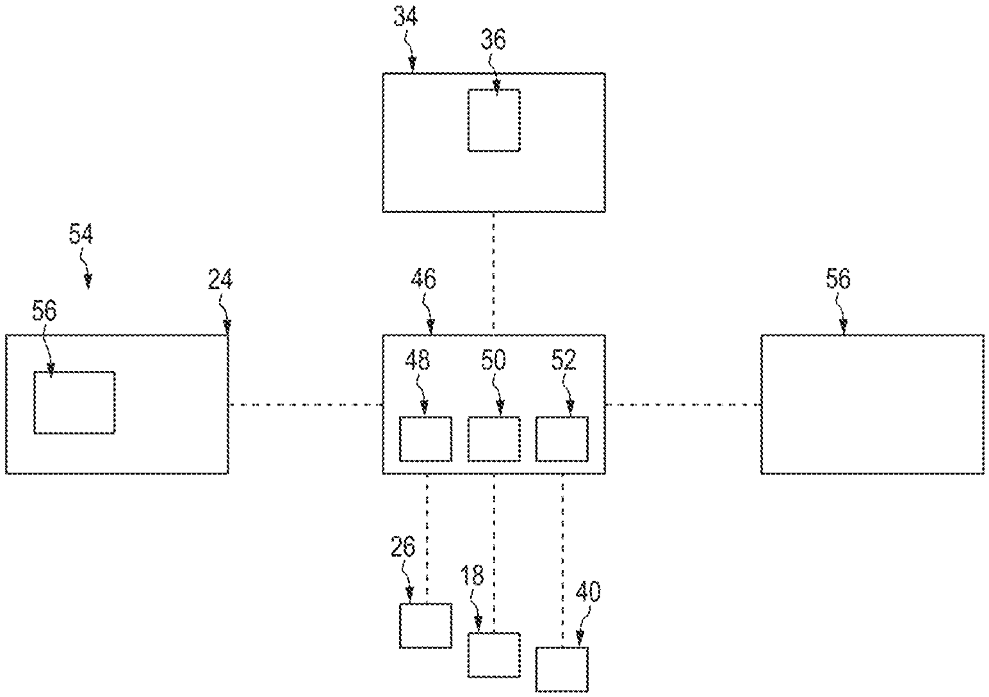
FIG. 3 is a diagrammatic view of a control system of the illustrative nitrogen-infused smoothie vending machine in communication to provide governing operations of the nitrogen-infused smoothie vending machine, in accordance with disclosed embodiments of the present disclosure.

Referring to FIG. 3, the nitrogen-infused smoothie vending machine 12 includes a control system 46 for governing operations. The control system 46 includes a processor 48 arranged for execution of instructions stored in memory 50, and communications circuitry 52 for communicating signals to and from the processor 48. The control system 46 is illustratively configured for governing operation of the smoothie storage system for storage and maintenance, the nitrogen system to provide nitrogen gas for infusion into the smoothie product, the dispensing system for dispensing appropriate smoothie product, and refrigeration system for maintaining temperature. Within the present disclosure, multiple embedded systems may wholly or partly share resources, components, hardware, and/or software.

In the illustrative embodiment as shown in FIG. 3, the control system 46 is arranged in communication with various systems for governing operation. The smoothie vending machine 12 includes a storage vessel monitoring system 54 for monitoring conditions of storage vessel 24. The monitoring system 54 illustratively includes temperature, oxygen, and/or pressure sensors for monitoring temperature, oxygen, and/or pressure, respectively, within the storage vessel 24. In some embodiments, the monitoring system 54 may include any suitable manner of sensors. The monitoring system 54 is arranged in communication with the control system 54 to communicate monitoring information, illustratively temperature, oxygen, and/or pressure.

The control system 46 can determine the applicable conditions within the storage vessel 24 and issue commands to adjust one or more conditions accordingly. For example, an oxygen level within the storage vessel (and/or within the smoothie product itself) may indicate undesirable presence of oxygen which can be purged by introduction of additional nitrogen. When the control system 46 determines, based on the information from the monitoring system 54, that the present oxygen level exceeds a predetermined threshold, the control system 46 may provide control operation to provide additional nitrogen from the nitrogen system to the storage vessel 24.

Examples of suitable processors may include one or more microprocessors integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry can include components for facilitating processor operations, for example, suitable components may include transmitters, receivers, modulators, demodulators, filters, modems, analog/digital (AD or DA) converters, diodes, switches, operational amplifiers, and/or integrated circuits.

The vending machine 12 illustratively includes a user interface 56, embodied as a touch screen display graphical user interface. The user interface 56 is arranged in communication with the control system 46 to operate the dispensing system 40 for dispensing under vending operation. The user interface 56 is illustratively embodied to provide a payment platform for receiving user payments, for example, via electronic payments, and/or can be used in conjunction with a cash input peripheral. The user interface 56 can receive user inputs for selection of smoothie options, for example, size and/or flavor and communicates with the control system 46 to secure payment and initiate dispensing activities.

The control system 46 may be arranged to communicate with external systems and/or devices. For example, other servers or resources (e.g., physical, virtual, cloud, internet, intranet, etc.) may communicate/receive data to/from control system 46. The operation disclosed herein are illustratively implemented on processor 48, which may include one or more processors, but in some embodiments, may be implemented apart from the processor 48 as a semi-integrated or distinct system of execution in communication with the control system 46. For example, electronic payment may be completed via external communications with financial service providers.

The nitrogen-infused smoothie product has certain consistency, and relatedly, certain flow characteristics under its slurry-like behavior. Within the present disclosure, important parameters can affect slurry behaviors in storing, maintaining, and/or dispensing. The measurement techniques and predicted ranges for quality assurance will also be discussed.

Fruit Quality—Browning is a process that can turn damaged fruit tissues into having a brownish appearance. Table 1 summarizes the two main mechanisms and preventative methods to preserve fruit quality which will ensure the freshness of our smoothies.

TABLE 1

| Fruit Browning Mechanisms and Controls. | | |
|---|---|---|
| | Mechanisms | Control methods |
| Enzymatic Browning | Oxidordeuctases (Oxidation of Poly phenolic substances; decomposition of vaitamin C, catalyzed by ascorbic acid; Areobic dehydrogenases for destroying hydrogen peroxide). These oxidases catalyze a chain reaction which turns phenols into brown compounds when fruit tissues are damaged. | Limiting $O_2$ dissolved in the slurry by air treatment, inert gas packing or by using special filling system. Add antioxidant substances. |
| Non-enzymatic Browning (Maillard reaction) | Amidogen reacts with the hydroxyl of sugar and becomes a high molecular melanoid. | $SO_2$ treatment Limiting $O_2$ Temperature and retention time control |

Within the present disclosure, the smoothie product can resemble a complex colloid composed of pectin, protein, and other hydrophilic colloids. The stability of this colloid can be affected by the pH, ionic strength, density of particles, size of particles (R), and/or its viscosity (μ). These relationships are shown in the Stokes' settling velocity formula:

$$v_t = \frac{2}{9} \cdot \frac{(\rho_s - \rho_f)gr^2}{\mu}$$

The settling velocity approaches zero when the fluid viscosity increases, particles' radii decrease, and density of the solid equals to density of the fluid. The density difference and the radii of solids can be controlled by mechanical methods such as grinding. The viscosity can be measured at a constant temperature with increasing speed of the sample using a viscometer[1]. Among smoothie products within the present disclosure, such slurries likely exhibits pseudoplastic behaviors, and the slope of "viscosity vs. speed" should be negative (i.e., viscosity decreases with increasing shear rate).

1 https://www.muser-my.com/wp-content/uploads/2018/10/C78IA001EN_A_ViscoQC_Juice.pdf 2 Madlener, K.; Frey, B.; Ciezki, H. K. *Progress in Propulsion Physics* 1. 2009, 237-250. DOI: 10.1051/eucass/200901237

REFERENCES 1 and 2 are incorporated by reference herein in their entireties, and at least including those specification sections referred.

Turbulent vs Laminar Flows—smoothie products within the present disclosure likely follow the Ostwald-de Waele relationship, or power-law fluid whose generalized Reynolds number was described in the Metzner and Reed model2:

$$Re_{PL} = \frac{\rho D^n u^{2-n}}{K\left[\frac{3n+1}{4n}\right]^n 8^{n-1}}$$

Where K is the flow consistency index (Pa·s$^n$); n is the flow behavior index; u is the velocity of the fluid (m/s); D is the diameter of the pipe (m); ρ is the density of the fluid. Here, K and n can be experimentally determined by plotting $$\log(\mu_{eff}) \text{ vs. } \log\left(\frac{\partial u}{\partial y}\right)$$

following the expression:

$$\mu_{eff} = K\left(\frac{\partial u}{\partial y}\right)^{n-1}$$

This expression derives from the Ostwald-de Waele power law for shear stress of time-independent non-Newtonian fluid, in which n<1 for pseudoplastic fluids such as our smoothies.

$$\tau = K\left(\frac{\partial u}{\partial y}\right)^n$$

The importance of this Reynolds calculation is that determination can be made of the dispensing velocity to ensure turbulent flow for better mixing. For laminar flows, Re is less than 2,100 and for turbulent flows, it exceeds 4,000.

pH Measurements and Total Soluble Solids (TSS)—pH is also an important parameter to confine our product's quality. The two common methods are:

1. calorimetric methods: indicators solutions or pH papers. This method is affordable with an accuracy trade-off.
2. Electrochemical methods: using electrodes and a millivoltmeter.

The pH can be affected by the contents in the smoothie product. Generally, a value of less than 4.0 can be desired, but this depends on the particular fruits/vegetables. pH range can be an effective method to control our product's quality. Total soluble solids measurement is another method to measure the soluble content in our storing vats including sugars, carbohydrates, organic acids, protein, and minerals. The TSS can be measured using a hydrometer, refractometer, or high-performance chromatography. Of these, the refractometer method is useful in determining the ripeness of the ingredient fruits. Generally, the higher the sugar content, and/or the riper the fruits, the higher the reading bix % (i.e., the higher TSS). The mean value of TSS can also increase the longer the smoothies stay in our vats due to the breakdown of carbohydrates.

Nitrogen Solubility—The solubility of a gas in liquids is a function of temperature. The lower the temperature, the gases can become more soluble in the liquids since the Gibbs energy will become more negative, meaning more spontaneous.

$$\Delta G = \Delta H - T\Delta S$$

Henry's law can determine the pressure required for dissolving a certain amount of gas into liquids. At 25 °C, the Henry's constant for $N_2$ dissolved in water is 87,650 bar$^{-1}$.[3] Assuming only $N_2$ (1) and $H_2O$ (2). Applying Henry's law for $N_2$ (species 1) and Raoult's law for water (species 2) gives $$y_1 P = x_1 H_1 \text{ and } y_2 P = x_2 P_2^{sat}$$

Assuming 3 °C, the Henry's constant at this temperature according to the van't Hoff equation is:

$$H = H^o \exp\left[\frac{-\Delta H_{soln}}{R}\left(\frac{1}{T} - \frac{1}{T^o}\right)\right] =$$

-continued $$87{,}650\ \exp\left[1300\left(\frac{1}{273.15+3}-\frac{1}{273.15+25}\right)\right]=124{,}054\ \text{bar}^{-1}$$

$P^{sat}$ is the saturated pressure and can be determined using Antoine's equation:

$$\ln P^{sat}=A-\frac{B}{T+C}\rightarrow P_2^{sat}=e^{16.3872-\frac{3885.70}{3+230.17}}=0.768\ kPa\approx 0.00768\ \text{bar}$$

The pressure required to achieve $x_1$ liquid mole percent of $N_2$, assuming the vapor mole fraction of $N_2$ ($y_1$) close to 1 is:

$$P=\frac{x_1H}{y_1}\approx x_1H=124{,}054x_1$$

Therefore, to obtain, say 0.005% mole fraction of liquid $N_2$, increasing the pressure would be required up to $$124{,}054\times\frac{0.005}{100}=6.2\ \text{bar}.$$

This would be higher for dissolving $CO_2$ because the Henry's constant for $CO_2$ is only around 1,670 $\text{bar}^{-1}$. From the above equation, back-calculating can be used to determine the mole fraction $x_1$ to meet the criteria such as texture and/or foam height at different pressure.

As shown above, the vapor mole fraction of $N_2$ can be calculated by $$y_2=\frac{x_2P_2^{sat}}{P}\approx\frac{P_2^{sat}}{P}=\frac{0.00768}{P}$$

At 6.2 bar, the vapor mole fraction of $H_2O$ is $$y_2=\frac{0.00768}{6.2}=0.00124,$$

which means the vapor consists of 99.88% $N_2$.

Smoothie Production: Quality Assurance and Industrial Standards-Industrial standards of analytical testing for smoothie production can assist in describing the smoothie product. Important parameters for smoothie quality that should be monitored include sugar and acidity. Sugars including glucose, fructose, and sucrose can be measured through Soluble Solids Content (SCC, ° Brix). Acidity measurement techniques include Titratable acidity (TA) and pH. Another challenge with long-term storage is the oxidation of fruits which can detrimentally affect their nutritional values and/or pose hazards. This process is called adulteration which can be tested by checking water content. Other methods such as using an iodine solution, or table salt might also work for smoothies containing milk, but usually, color changes can be readily observed. Juice spoilage can be of concern as it is subject to rapid microbial, enzymatic, biochemical deterioration. Table 1 summarizes certain hazards of juice spoilage.

TABLE 1

Hazards of Juice Spoilage

| Hazards | Results |
|---|---|
| Microbial contamination | Survival/growth of pathogens. Rapid spoilage |
| Aflatoxins | Unsafe/illegal product |
| Pesticide residues | Unsafe/illegal product |
| Spurious dissolved matter | Unsafe, off-flavor |
| Spurious particulates | Unsafe, reduced quality |
| Enzymatic activity | Browning, consistency/flavor changes |
| Dissolved oxygen | Browning, nutrient and quality reduced |
| Metallic cations | Flavor/color/nutrient losses, health hazards |
| Maillard reactants | Browning, quality loss |
| Colloidal instability | Sedimentation/precipitation/haze |
| Extended holding | Quality deterioration |

Certain unit operations which can be applied to juice manufacturing are summarized in Table 2.

TABLE 2

Unit Operation in Juice Production

| Unit Operation | Function |
|---|---|
| Mass transfer | Fruit delivered, dry cleaned |
| Extraction | Washed |
| Separation | Sized, graded |
| Separation | Peeled, cored and deseeded |
| Size Reduction | Crushed, comminuted |
| Pressure application | Juice extraction |
| Separation | Solids screened |
| Deaeration | Oxygen removal |
| Centrifugation | Solids separation |
| Filtration (rotary vacuum filter) | Clarification |
| Fluid flow | Juice transferring, pumping |
| Heat transfer | Enzymes inactivated, juice pasteurized and cooled |
| Concentration/evaporation | Volume reduction, stability |
| Mass transfer | Packaging, shipping |

Table 3 summarizes some quality criteria used in juice manufacturing which can provide a rational reference for smoothie quality assurance.

TABLE 3

Quality Criteria for Juicing

| Factor | Criteria | Purpose |
|---|---|---|
| Maturity | Ripeness | Optimum quality |
| Solids | Adequate level | Affects yield , flavor |
| Acidity | Appropriate pH level | Flavor, sugar/acid ratio |
| Color | Fully developed | Juice appearance |
| Defects | Appropriate level | A few can be tolerated |
| Size/shape | Uniform | Ease of handling/juicing |
| Specific chemicals | Past analyses | Reflect handling/quality |
| Pesticide residues | Regulatory control | Legality of product |
| Foreign matter | Appropriate level | Reasonable limits |
| Microbial count | Low total, no or few pathogens | Safety/stability of uice |
| Aflatoxin level | Below proscribed limits | Juice safety |

°Brix/Acidity Ratio or SSC/TA Ratio—This ratio can provide a good reference for our product quality control. Degrees brix is simply a measure of the dissolved solids which usually indicate the sugar content of an aqueous solution. One degree Brix is equivalent to 1 g of sucrose in 100 grams of solution. Below are the three common measurement techniques for ° Brix:

1. Specific Gravity using a hydrometer, pycnometer, or an electronic oscillating U-tube meter. Degrees Brix can also be estimated using the polynomial expansion:

$$Bx = 182.4601S^{\wedge}3 - 775.6821S^{\wedge}2 + 1262.7794S - 669.5622$$

2. Refractive index: this optical method can be compared with published np vs. °Bx plots.
3. Infrared absorption: techniques include mid-infrared (MIR), non-dispersive infrared (NDIR), and Fourier transform infrared (FT-IR). These techniques can also be used to examine adulteration. Details can be found in reference 2.

As for titratable acid, the measurement technique can simply plot the pH vs amount of 1 M sodium hydroxide added and observe the abrupt change in the slope. Another method is to use acid-base titration color indicator such as phenolphthalein for color change when the enough NaOH is added to the smoothie sample (acidic).

In short, °Brix can be quickly obtained using a hand-held or in situ sugar refractometer, and titratable acid can be measured using a pH meter or a conventional method in which NaOH is added. The desirable range for this ratio may depend on the constituent ingredients. However, this parameter can be a reference for taste control (e.g., sour vs. sweet). From this ratio, soluble solid content (from °Brix), pH, saccharin adulteration, can be derived, among other aspects. As suggested above, pH is one of the useful analytical methods. An effective pH range of preservatives and additives can be seen in Table 4.

TABLE 4

Common Preservatives and Additives for Smoothies

| Preservative | Use |
|---|---|
| $SO_2$ | Slows down microbial and enzymatic activity |
| Benzoates | Antimicrobial at pH < 4.5 |
| Sorbates | Antimicrobial at pH < 6.5 |
| $CO_2$ | pH reduction, anaerobic atmosphere |
| Ascorbic Acid | Slows down enzymatic browning |
| Dimethylpyrocarbonate | Antimicrobial |

References considered and incorporated by reference herein in their entiries include: Alake, O. T.; Abraham, D. O.; Akinola, T. O.; Fatunmibi, O. O.; Agboola, T. O.; Akua, S. I. *International Journal of Innovative Science and Research Technology*. "Production and Evaluation of Smoothies Made from Various Fruits Sold in Lagos Market." 2022; Galaxy Scientific NIR for Food. https://nir-for-food.com/fruit-juices-analysis/: Bates, R. P.; Morris, J. R.; Crandall, P. G. "Principles and Practices of Small and Medium-scale Fruit Juice Processing." 2001. ISBN: 92-5-104661-1.

Accordingly, specific conditions concerning the flow characteristics, and therefore, the required design of components, systems, and methods to accommodate such smoothie products can be appreciated. Devices, systems, methods within the present disclosure can include in situ monitoring of such smoothie quality parameters, for example, within the vending machine 12. In some embodiment, the control system may be arranged in communication with remote systems, such as a centralize monitoring system to monitor such smoothie quality parameters, and/or other vending machine parameters. For example, the control system may include wired or wireless communications architecture for communications with remote systems.

The vending machine 12 may optionally include an infusion contactor 58 configured for additional nitrogen infusion. The infusion contactor 58 is illustratively arranged in line with piping between the storage vessel 24 and the dispensing system 40. The infusion contactor 58 includes an inlet for receiving nitrogen from the nitrogen system 34 and an inlet for receiving smoothie product from the smoothie storage system, the received smoothie product being at least partially nitrogenated. The infusion contactor 58 is configured to pass nitrogen and smoothie product in contact with each other via a plurality of contact chambers to further nitrogenate the smoothie product to final nitrogen infusion level. Each contact chamber admits nitrogen and smoothie product with high contact surface area to engage with the nitrogen for infusion. The infusion contactor 58 illustratively includes a trimming valve arranged to allow adjustment of the rate of nitrogen inflow for adjusting the final level of nitrogen infusion of the smoothie product exiting the infusion contactor 58.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure a rising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

We claim:

1. A nitrogen-infused smoothie vending machine, comprising:

a refrigeration system comprising an insulated housing and refrigerator for cooling an interior portion of the insulated housing, a smoothie storage system comprising a pressurizable storage vessel for storing smoothie product and an agitation system for agitating smoothie product within the pressurizable storage vessel, the pressurizable storage vessel arranged within the insulated housing, a nitrogen system configured for providing nitrogen for infusion of smoothie product, a dispensing system configured for dispensing nitrogen-infused smoothie product for consumption, and a control system comprising at least one processor arranged for execution of instructions stored in memory, and communications circuitry for communicating signals to and from the processor, the control system configured for governing operation of the nitrogen system to provide nitrogen gas for infusion into the smoothie product, and configured for governing operation of the dispensing system for dispensing nitrogen-infused smoothie product, wherein the control system is configured to provide nitrogen from the nitrogen system to the smoothie product storage system, wherein the nitrogen system is arranged to supply nitrogen to an infusion contactor configured to pass smoothie product from the pressurizable storage vessel in contact with nitrogen for infusion, the infusion contactor arranged between the smoothie storage system and the dispensing system.

2. The vending machine of claim 1, wherein the nitrogen provided from the nitrogen system is nitrogen gas.

3. The vending machine of claim 1, wherein the nitrogen provided from the nitrogen system is nitrogen and carbon dioxide gas.

4. The vending machine of claim 1, wherein the control system is configured to selectively operate a nitrogen valve to maintain nitrogen within the pressurizable storage vessel.

5. The vending machine of claim 1, wherein the nitrogen system comprises a bulk nitrogen storage vessel.

6. The vending machine of claim 1, wherein the agitation system comprises a mechanical agitator arranged to disrupt settlement of the smoothie product within the pressurizable storage vessel.

7. The vending machine of claim 6, wherein the agitation system comprises magnetic field generation system arrange to provide magnetic driven motion to the mechanical agitator arranged within the pressurizable storage vessel.

8. The vending machine of claim 6, wherein the control system is configured to govern operation of the agitation system to agitate the smoothie product.

9. The vending machine of claim 1, wherein the nitrogen system comprises a nitrogen generator for producing nitrogen from ambient air.

10. The vending machine of claim 1, wherein the smoothie product comprises a slurry.

11. The vending machine of claim 9, wherein the control system is configured to provide nitrogen into the pressurizable storage vessel for storing smoothie product for at least partial infusion of the smoothie product.

12. The vending machine of claim 10, wherein the control system is configured to provide nitrogen into the pressurizable storage vessel to regulate the oxygen level therein.

13. The vending machine of claim 1, wherein the control system is arranged in communication with a remote system for communications of vending machine parameters.

14. The vending machine of claim 13, wherein the vending machine parameters includes at least one of smoothie quality parameters, amount of smoothie within the storage vessel, and amount of nitrogen within the nitrogen system.

* * * * *